United States Patent
Hall, Jr. et al.

(10) Patent No.: US 12,187,429 B2
(45) Date of Patent: Jan. 7, 2025

(54) INSERTS FOR COUPLING TO AIRCRAFT COMPONENTS WITH CONSISTENT POSITIONING RELATIVE TO THE AIRCRAFT COMPONENT

(71) Applicant: THE BOEING COMPANY, Chicago, IL (US)

(72) Inventors: Curtis L. Hall, Jr., Moncks Corner, SC (US); David Lutz, Ladson, SC (US)

(73) Assignee: The Boeing Company, Chicago, IL (US)

( * ) Notice: Subject to any disclaimer, the term of this patent is extended or adjusted under 35 U.S.C. 154(b) by 349 days.

(21) Appl. No.: 17/721,074

(22) Filed: Apr. 14, 2022

(65) Prior Publication Data

US 2022/0340256 A1   Oct. 27, 2022

Related U.S. Application Data

(60) Provisional application No. 63/180,512, filed on Apr. 27, 2021.

(51) Int. Cl.
*B64C 7/00* (2006.01)
*F16B 37/04* (2006.01)

(52) U.S. Cl.
CPC .............. *B64C 7/00* (2013.01); *F16B 37/048* (2013.01)

(58) Field of Classification Search
CPC ...... F16B 37/048; F16B 21/18; F16B 13/141; F16B 37/043; F16B 37/00; F16B 37/04; F16B 37/044; F16B 37/045; F16B 37/06; F16B 13/0808; F16B 37/12; F16B 37/122; B64C 7/00

USPC .................. 411/82, 82.1, 427, 517, 536, 544, 411/340–343, 535; 16/2.1–2.5
See application file for complete search history.

(56) References Cited

U.S. PATENT DOCUMENTS

| | | | | |
|---|---|---|---|---|
| 2,877,817 A | * | 3/1959 | Rockwell | F16B 37/122 411/965 |
| 3,579,942 A | * | 5/1971 | Cole | F16B 5/01 428/116 |
| 3,869,958 A | * | 3/1975 | Murayama | F16B 21/076 411/15 |
| 4,770,583 A | * | 9/1988 | Lindberg | F16B 13/08 411/340 |
| 4,981,735 A | * | 1/1991 | Rickson | F16B 39/225 428/338 |

(Continued)

*Primary Examiner* — William D Hutton, Jr.
*Assistant Examiner* — Dil K. Magar
(74) *Attorney, Agent, or Firm* — Joseph M. Butscher; The Small Patent LAw Group LLC

(57) ABSTRACT

The present disclosure provides an insert that includes a locking mechanism that may either be formed integrally to the component or attached separately to the insert body. The top of the locking mechanism is offset from the first surface by an offset distance to enable the insert to be coupled to a recess of a component such as an aircraft component. An aperture formed in a top surface of the first portion is configured to allow additional elements to be coupled to the aircraft component. The coupling of the insert to the aircraft component is further promoted by a compression mechanism that forces the locking mechanism to couple to an overhang portion of the top layer after the force applied to the insert once it is positioned in the recess is removed, such that the top surface of the insert is co-planar with an outermost surface of the aircraft component.

20 Claims, 11 Drawing Sheets

(56) References Cited

U.S. PATENT DOCUMENTS

| | | | |
|---|---|---|---|
| 2002/0119026 A1* | 8/2002 | Gauron | F16B 37/043 |
| | | | 411/112 |
| 2010/0026028 A1* | 2/2010 | Smith | F16B 37/043 |
| | | | 296/29 |
| 2011/0220267 A1* | 9/2011 | Blancaneaux | C08L 63/00 |
| | | | 156/247 |
| 2013/0014376 A1* | 1/2013 | Komsitsky | F16B 5/0208 |
| | | | 29/525.02 |
| 2013/0031765 A1* | 2/2013 | Lan | F16B 37/061 |
| | | | 29/428 |
| 2013/0094921 A1* | 4/2013 | McClure | F16B 13/12 |
| | | | 411/45 |
| 2016/0016522 A1* | 1/2016 | Smith | B60R 13/0212 |
| | | | 296/35.1 |
| 2017/0082125 A1* | 3/2017 | Richardson | F16B 37/122 |
| 2017/0253006 A1* | 9/2017 | Lopez | B32B 3/266 |
| 2017/0284434 A1* | 10/2017 | Lopez | F16B 5/01 |
| 2017/0284437 A1* | 10/2017 | Landsberg | F16B 37/043 |
| 2017/0370396 A1* | 12/2017 | Kitajima | F16B 37/122 |
| 2019/0338803 A1* | 11/2019 | Buczynski | F16B 13/08 |
| 2019/0358908 A1* | 11/2019 | Sankaran | B29C 66/8322 |

* cited by examiner

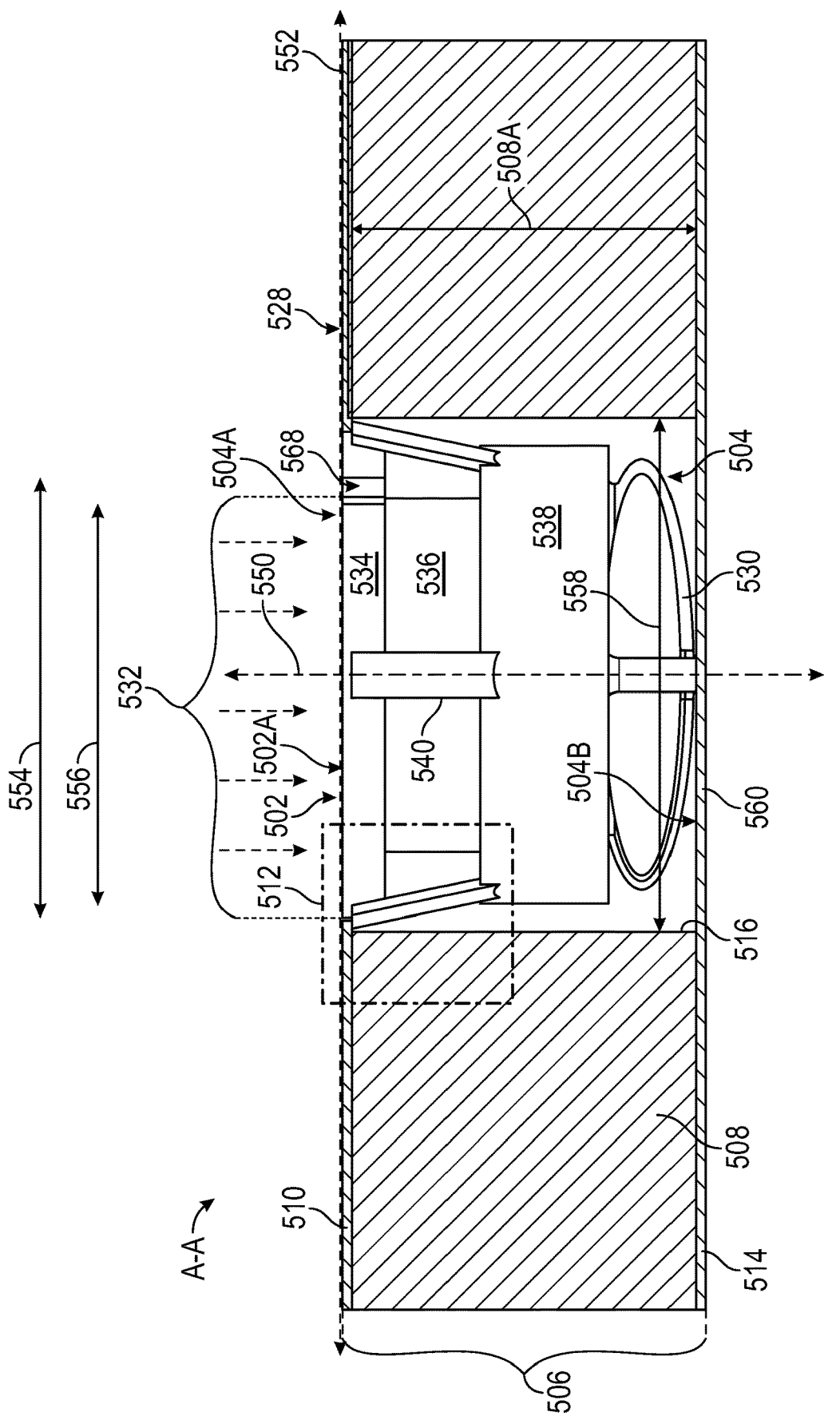

INSERTS FOR COUPLING TO AIRCRAFT COMPONENTS WITH CONSISTENT POSITIONING RELATIVE TO THE AIRCRAFT COMPONENT

CROSS-REFERENCE TO RELATED APPLICATIONS

This disclosure claims benefit of and priority to U.S. Provisional Patent Application Ser. No. 63/180,512 filed Apr. 27, 2021, which is hereby incorporated by reference in its entirety.

FIELD

Aspects of the present disclosure relate to inserts coupled to components including aircraft components.

BACKGROUND

Components, such as aircraft components, may include aspects that allow for the coupling of additional elements to the aircraft components. The additional elements are coupled to the aircraft components via inserts in the aircraft components which allow for additional elements to be coupled to the aircraft components via wires, threads, press-fit, or other types of couplings. The inserts are secured to the aircraft components so as not to become dislodged when the additional elements are coupled thereto, nor during the use of the additional elements. Aircraft components can include a large number of inserts which may take time and/or manpower to assemble. Accordingly, there remains a need for an insert that may be coupled to the aircraft components quickly and with consistent positioning relative to the aircraft component.

SUMMARY

In one aspect, the present disclosure provides a component including: a central axis; a first portion having a first surface; a second portion having a second surface; a connector portion extending between the first portion and the second portion; an aperture formed in the first portion along the central axis; a locking mechanism formed integrally to the component, the locking mechanism being offset from the first surface by an offset distance; and a compression mechanism coupled to the second portion.

In one aspect, in combination with any example component above or below, the component further includes the locking mechanism having a plurality of tabs, each tab of the plurality of tabs extending between the first portion and the second portion.

In one aspect, in combination with any example component above or below, the component further includes that the first portion, the second portion, the connector portion, and the locking mechanism are each formed from a same material, the same material comprising a polymer, a metal, a composite, a ceramic, or combinations thereof.

In one aspect, in combination with any example component above or below, the component further includes that the compression mechanism is formed from a polymer, a metal, a composite, a ceramic, or combinations thereof.

In one aspect, in combination with any example component above or below, the component further includes that the aperture includes an attachment element.

In one aspect, in combination with any example component above or below, the component further includes that a first outside diameter of the first portion is about the same as a second outside diameter of the second portion.

In one aspect, in combination with any example component above or below, the component further includes that an outside diameter of the connector portion is less than both the first outside diameter and the second outside diameter.

In one aspect, in combination with any example component above or below, the component further includes that each tab of a plurality of tabs of the locking mechanism is at an angle (a) relative to the first surface of the first portion from about 10 degrees to about 80 degrees.

In one aspect, in combination with any example component above or below, the component further includes that the offset distance is from about 0.020 inches to about 0.050 inches.

The present disclosure provides an assembly, in one aspect, the assembly including: an insert having: a central axis; a first portion having a first surface; a second portion having a second surface; a connector portion extending between the first portion and the second portion; an aperture formed in the first portion along the central axis; locking mechanism positioned circumferentially around the insert, the locking mechanism including a plurality of tabs extending from a first shared element and being positioned an offset distance from the first surface of the first portion; and a compression mechanism coupled to the second portion.

In one aspect, in combination with any example assembly above or below, the assembly further includes the first shared element being coupled to a first outside surface of the first portion.

In one aspect, in combination with any example assembly above or below, the assembly further includes the locking mechanism having a second shared element.

In one aspect, in combination with any example assembly above or below, the assembly further includes each of the plurality of tabs extending between the first shared element and the second shared element, the second ring being coupled to a second outside surface of the second portion.

In one aspect, in combination with any example assembly above or below, the assembly further includes that the insert is formed from a first material and the locking mechanism is formed from a second material, the first material being different from the second material.

In one aspect, in combination with any example assembly above or below, the assembly further includes that a first outside diameter of the first portion is less than a second outside diameter of the second portion.

In one aspect, in combination with any example assembly above or below, the assembly further includes that each of the plurality of tabs is at an angle (a) relative to the first surface from about 10 degrees to about 80 degrees.

In one aspect, in combination with any example assembly above or below, the assembly further includes a component having a first layer, the first layer forming a first surface of the component and being formed over a second layer; a recess formed in the first surface of the component, the recess extending into the second layer and being defined by an opening in the first surface and a sidewall, a portion of the first layer extending a predetermined distance into the recess around the opening of the recess, the component being positioned in and secured to the recess via a coupling of the locking mechanism and the portion of the first layer extending into the recess, the first surface of the insert being co-planar with the first surface of the component.

The present disclosure provides a method of making an assembly, in one aspect, the method including: positioning a first component in a recess of a second component; the first component having: a central axis; a first portion having a first surface; a second portion having a second surface; a first aperture formed in the first portion along the central axis; a first locking mechanism extending circumferentially around the first component, the first locking mechanism being offset from the first surface by a first offset distance; and a first compression mechanism coupled to the second surface, the first compression mechanism being in a first, uncompressed state. The second component includes a first layer formed on a second layer, a portion of the first layer extending for a first predetermined distance into a first opening of the recess. The method of forming the assembly further includes: applying force along the central axis of the first component in a first direction, causing the first compression mechanism to be in a second, compressed state. The central axis of the first component is aligned with a central recess axis of the recess. The method further includes: removing the force applied along the central axis in the first direction; and coupling, in response to removing the force applied in the first direction, the first component to the recess. Removing the force applied in the first direction causes the first compression mechanism to return to the first, uncompressed, state, such that the first locking mechanism is secured to the portion of the first layer extending around the first opening of the recess, the first surface being co-planar with the first layer of the second component when the first compression mechanism returns to the first, uncompressed, state.

In one aspect, in combination with any example method above or below, the method further includes: positioning a third component in the recess of the second component, the recess being a through-hole extending from the first opening on the first surface of the second component to a second opening on the second surface of the second component along the central axis, the second surface being opposite the second surface; the third component having: a third portion having a third surface; a fourth portion having a fourth surface; a second aperture formed in the third portion along the central axis; a second locking mechanism extending circumferentially around the first component, the second locking mechanism being offset from the third surface by a second offset distance; and a second compression mechanism coupled to the fourth surface, the second compression mechanism being in a first, uncompressed, state. The second component includes a third layer formed on the second layer, a portion of the third layer extending a second predetermined distance into the second opening. The method further includes: applying force along the central axis of the third component in a second direction, causing the second compression mechanism to be in a second, compressed state; removing the force applied along the central axis in the second direction; and coupling, in response to the removing the force applied along the central axis, the third component to the recess. Removing the force applied along the central axis causes the second compression mechanism return to the first, uncompressed state, such that the second locking mechanism is secured to the portion of the third layer extending around the second opening of the recess, the third surface of the third component being co-planar with the third layer of the second component when the second compression mechanism returns to the first, uncompressed state.

In one aspect, in combination with any example method above or below, the method further includes disposing, via a first notch formed in the first surface of the first component, a plurality of potting material into the recess of the second component.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

FIG. 5B depicts a side view of an assembly including an insert according to aspects of the present disclosure.

DETAILED DESCRIPTION

Figure 1A:
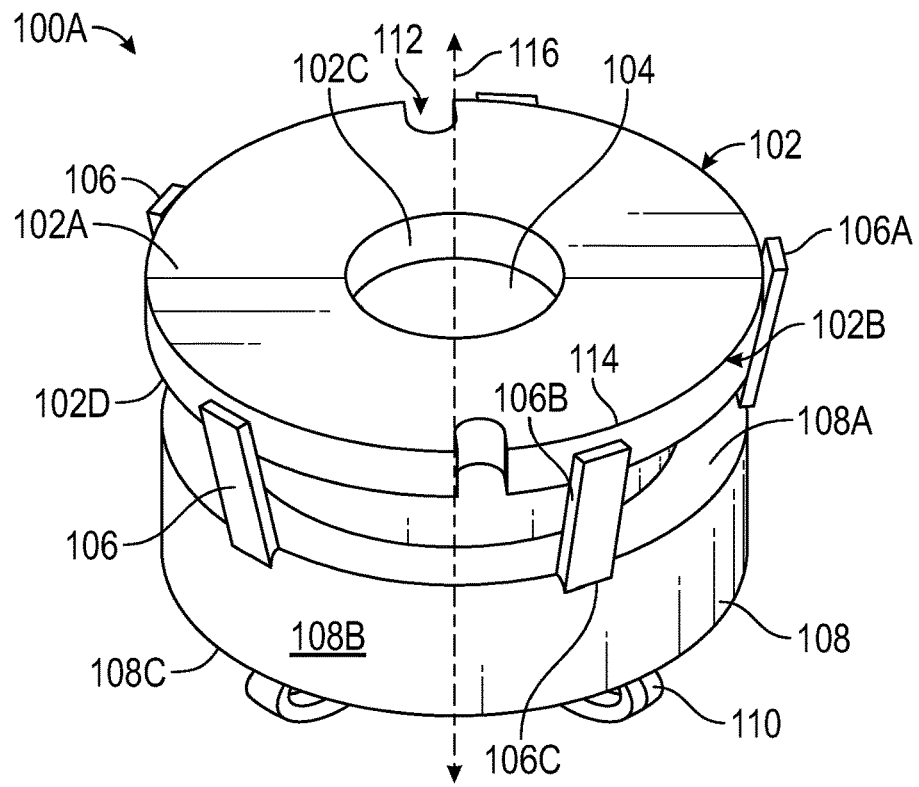
FIG. 1A depicts an example insert according to aspects of the present disclosure.

The present disclosure provides for a system including an assembly configured to have one or more additional elements coupled thereto. Each assembly includes a first component such as an aircraft component and one or more second components, that may be alternately referred to herein as "inserts," as these components are inserted, e.g., positioned, in recesses of the first component. The aircraft components discussed herein may include composite panels having a plurality of layers. The composite panels may be used in aircraft bodies or interiors. Each of the plurality of layers of the component may be formed from one or more of a polymer, textile, metal, alloy, ceramic, composite, superalloy, or other material or combination of materials.

A single aircraft component, such as a panel on an aircraft body, interior (cabin), wing, or engine, can include dozens, hundreds, or thousands of inserts, sometimes referred to as potted inserts. Accordingly, a significant amount of time and labor, and thus cost, can go into ensuring that the inserts are flush with the aircraft components as well as being properly secured into each recess. It is desired that the inserts, such as potted inserts, be flush with the laminate, for example, decorative laminate, to not only provide sufficient strength, but also for aesthetic purposes. Inserts may be secured via a coupling such as press-fit, spring-loaded, threading, magnetics, or a potting material that may be applied in a non-solid form and then solidify. In embodiments, the inserts are fabricated to press and flex in and then sprint out to engage with a bottom face of the panel skin. As used herein, two elements of an assembly are said to be "flush" with respect to each other if they are co-planar, that is, when a surface of one element of the assembly, such as the inserts discussed herein, shares a plane with a surface of another element, such as the aircraft component, of the assembly.

As noted above, the aircraft components can include a plurality of layers, including a first layer that may be referred to as a top layer that is an outermost layer of the aircraft component, thus forming a top (first) surface of the aircraft component. The recesses discussed herein are defined by at least one opening and a sidewall. A portion of the first layer extends circumferentially around the opening of the recess for a predetermined distance. This predetermined distance may be referred to as an overhang distance since this portion of the top layer hangs over the edge of the opening. In some examples, the recess of the aircraft component includes a bottom surface. In this example, the recess extends through the top layer and into at least a portion of a second layer adjacent the top layer, but the recess does not extend through the aircraft component. In some examples, the aircraft component includes a third layer that may be referred to as a bottom layer which is positioned adjacent the second layer on a side opposite the first layer. In this example, the third layer is also an outermost layer on a different side of the aircraft component that is opposite the top layer and top surface and thus may be referred to as a bottom surface of the aircraft component. In an example, the recess is a through-hole which extends through the aircraft component. In this example, the recess includes two openings, one in the first layer and one in the third layer. In this example, a portion of the third layer, which may be a wider or narrower portion than the overhang portion of the first layer and is also referred to as an overhang portion, and extends into the recess of the second opening. Each of the layers of the aircraft components discussed herein may include two or more sub-layers of varying thicknesses and/or materials. Accordingly, the recesses discussed herein may be of varying diameters, lengths (heights), tapers (including no taper), and opening geometries (round, elliptical, polygonal, triangular, or combinations thereof).

The assembly including the insert and the aircraft component may be accomplished by positioning the insert relative to the recess such that a central axis of the recess is aligned with a central axis of the insert such that the recess and the insert have a shared central axis. The shared central axis may be at any angle relative to the top (or bottom) surface of the aircraft component. The insert may include a locking mechanism and a compression mechanism. As used herein, a "locking mechanism" is an element capable of securing a first component, such as an insert, to a second component, such as an aircraft component. Further as used herein, a "compression mechanism" is an element configured to undergo compression without being damaged. Further, the compression mechanisms discussed within are configured to be changed from a first state (e.g., an uncompressed state) to a second state (e.g., a compressed state) in response to the application of force, and to return to the first state when the force is removed. The inserts discussed herein can further include an aperture configured to couple to an additional element. The aperture may extend through a portion of the insert, or may extend through the entire length of the insert. In some examples, the aperture may include an attachment element that enables the insert to couple to an additional element such as a wire, threaded element, or other element. Accordingly, the attachment element may include threads, a helically-coiled wire, or may be configured as a magnetic or a press-fit mechanism. The locking mechanism can be configured to couple to the recess of the aircraft component via the overhang portion. This coupling may be accomplished when force is applied to the insert, for example, along its central axis. The force applied to the insert causes compression of the compression mechanism. When the force is removed, the compression mechanism causes the insert to move in a direction opposite of the applied force, which causes the locking mechanism to couple ("bite") into the overhang portion of the top layer of the aircraft component which extends into the recess. This coupling secures the insert to the recess. The inserts discussed herein may be referred to herein as "self-adjusting," since the inserts become flush with the outside component surface via the compression mechanism. This is in contrast to inserts or other components that may be manually or robotically maneuvered and/or adjusted after initial coupling into said position.

In one example, a first insert is coupled to the recess via a first opening in the top surface of the aircraft component, such that the top surface of the first insert is co-planar with the top surface of the aircraft panel. The recess in this example may be a hole with a bottom surface or may be a through-hole. In another example, when the recess is configured as a through-hole, a second insert is coupled to the second opening in the bottom surface of the aircraft component, such that the top surface of the second insert is co-planar with the bottom surface of the aircraft panel. In any example of a recess, the recess can be formed at a variety of angles relative to the first and/or second surfaces of the composite panel.

Example Inserts

FIG. 1A depicts a first insert 100A according to aspects of the present disclosure. The first insert 100A includes a first portion 102, a second portion 108 connected to the first portion 102 via a connector portion (not visible here), a plurality of notches 112, a locking mechanism 106, and a compression mechanism 110. The first portion 102 has a first surface 102A (that may be referred to as a "top" surface), a second surface 102D (that may be referred to as a "bottom" surface) opposite the first surface 102A, an outside surface 102B, and an inside wall 102C that forms an aperture 104 in the first portion 102 that is aligned along a central insert axis 116. Depending upon the example, the aperture 104 may include a thread, a helically coiled element, or other coupling mechanism. The second portion 108 includes a first surface 108A (that may be referred to as a "top" surface), an outside surface 108B, and a second surface 108C (that may be referred to as a "bottom" surface) opposite the first surface 108A.

The locking mechanisms discussed herein may take various forms, including as a plurality of tabs 106A that comprise the locking mechanism 106. Each tab 106A of the plurality of tabs 106A in the example locking mechanism 106 extends between the first portion 102 and the second portion 108. While six tabs 106A are shown in FIG. 1A, in other examples, more or less tabs 106A may be included in the locking mechanism 106. In one example, the locking mechanism 106 includes two tabs 106A. In another example, the locking mechanism 106 includes three to five tabs 106A. In yet another example, the locking mechanism 106 includes more than six tabs 106A. Each tab 106A of the plurality of tabs 106A may be positioned circumferentially around the outside surface 102B and positioned equidistant from each adjacent tab 106A. In one example, first end 106B of each of the plurality of tabs 106A extends from the outside surface 102B of the first portion 102, and a second end 106C of each of the plurality of tabs 106A is formed as to rest between and is in contact with both the first surface 108A and the outside surface 108B of the second portion 108. In other examples, the first end 106B of each of the plurality of tabs 106A extends from the second surface 102D of the first portion and does not contact the outside surface 102B. The first end 106B of each of the plurality of tabs 106A is positioned below the first surface 102A of the first portion 102 to form an offset distance 114. This offset distance 114 is discussed in further detail below in FIG. 5C. In other examples of the first insert 100A, the second end 106C of each of the plurality of tabs 106A may be seated on the first surface 108A and does not contact the outside surface 108B. In still other examples of the first insert 100A, the second end 106C of each of the plurality of tabs 106A may be seated on the outside surface 108B and does not contact the first surface 108A. In this example, the locking mechanism 106 is formed integrally to the first insert 100A, and is formed from the same material as the first insert 100A. The first insert 100A, and thus the locking mechanism 106, may be formed from a ceramic, a plastic, a polymer, an elastomer, a metal or alloy, a composite material, or other materials. In on example, the metal may include aluminum or aluminum alloy.

The compression mechanism 110 may be configured in various manners such that applying force towards the first surface 102A along the central insert axis 116 compresses the compression mechanism 110. Conversely, releasing the applied force causes the compression mechanism 110 to move the first insert 100A upward in the opposite direction of the applied force, causing the locking mechanism 106A to couple to a component, as discussed in detail below. The compression mechanism 110 may be formed from materials including metals, alloys, polymers, elastomers, composites, or other materials capable of functioning as discussed above. In on example, the metal may include aluminum or aluminum alloy, steel, or other metals or alloys. In this example, the compression mechanism 110 extends from the second surface 108C of the second portion 108. In other examples the compression mechanism may be additionally or alternately coupled to the outside surface 108B of the second portion 108. The compression mechanism 110 may be formed from the same material as the first insert 100A. In this example, the compression mechanism 110 may be formed integrally with the first insert 100A. In other examples, the compression mechanism 110 may be formed from a different material as compared to the first insert 100A. In this example, the compression mechanism 110 may be coupled to the second surface 108C of the second portion via an adhesive, a polymer or an elastomer including thermoset materials, a press-fit, or other mechanical, chemical, or combinations means.

Figure 1B:
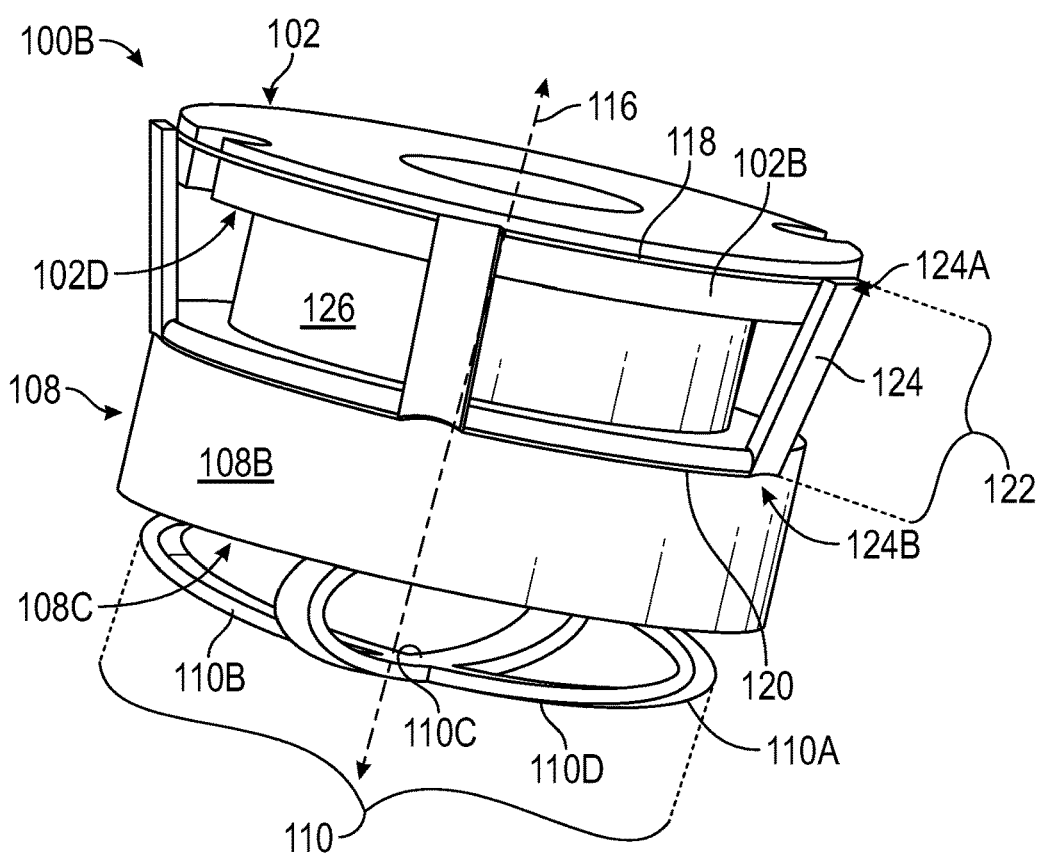
FIG. 1B depicts an isometric view of an example insert according to aspects of the present disclosure.

FIG. 1B depicts an isometric view of a second insert 100B according to aspects of the present disclosure. The second insert 100B is similar to the first insert 100A in FIG. 1A, and illustrates the connector portion 126 that extends between the first portion 102 and the second portion 108. In contrast with the first insert 100A, the second insert 100B includes a locking mechanism 122 having a plurality of tabs 124 that each extend between a first shared element 118, which may be referred to as a first ring, and a second shared element 120, which may be referred to as a second ring. The locking mechanism 122 in FIG. 1B includes six tabs 124. In other examples, the locking mechanism 122 includes two tabs 124. In another example, the locking mechanism 122 includes three to five tabs 124. In yet another example, the locking mechanism 122 includes more than six tabs 124. Each tab 124 of the plurality of tabs 124 may be positioned circumferentially around the outside surface 102B and positioned equidistant from each adjacent tab 124. While the tabs 124 (and 106A in FIG. 1A) are shown as being rectangular in FIGS. 1A and 1B, in other examples, the tabs (124, 106A) may have one or more rounded features or triangular features.

The first shared element 118 is shown in FIG. 1B as being coupled to each of the first ends 124A of each of the plurality of tabs 124. The first shared element 118 is further shown as being coupled to the outside surface 102B of the first portion 102. In other examples of the second insert 100B, the first shared element 118 may be coupled to the second surface 102D of the first portion. The second shared element 120 is shown in FIG. 1B as being coupled to each of the second ends 124B of each of the plurality of tabs 124. The second shared element 120 is further shown as being coupled to the outside surface 108B of the second portion 108. In other examples of the second insert 100B, the second shared element 120 may be coupled to the second surface 108C of the second portion 108. In other examples of the locking mechanism 122, a single shared element, which may be positioned as shown with the first shared element 118, the second shared element 120, or otherwise positioned, is coupled to each of the plurality of tabs 124 and used to secure the locking mechanism 122 to the second insert 100B. In the example of the second insert 100B, the locking mechanism 122 may be formed separately from the first portion 102, the second portion 108, and the connector portion 126 and subsequently assembled via mechanical, chemical, or a combination of means. In this example, the locking mechanism 122 may be coupled to the insert body. As discussed herein, the "insert body" includes the first portion 102, the second portion 108, and the connector portion 126. In examples where the locking mechanism 106 or other locking mechanisms discussed herein are formed integrally with the first portion 102, the second portion 108, and the connector portion 126, the locking mechanism 106 may be considered a part of the insert body.

FIG. 1B further illustrates the compression mechanism 110 as also shown in FIG. 1A. The compression mechanism 110 is coupled to the second surface 108C of the second portion and includes a first compression element 110A and a second compression element 110B that intersect at an overlapping point 110C. Each of the first compression element 110A and the second compression element 110B are shown in FIG. 1B to have a curved shape, and to have a similar shape. In other examples, one or both of the first compression element 110A and the second compression element 110B may have different shapes including one or more geometries such as spiral(s), straight legs, curved legs, a spiral geometry extending outward from the second surface 108C along the central insert axis 116, or combinations thereof.

Figure 2:
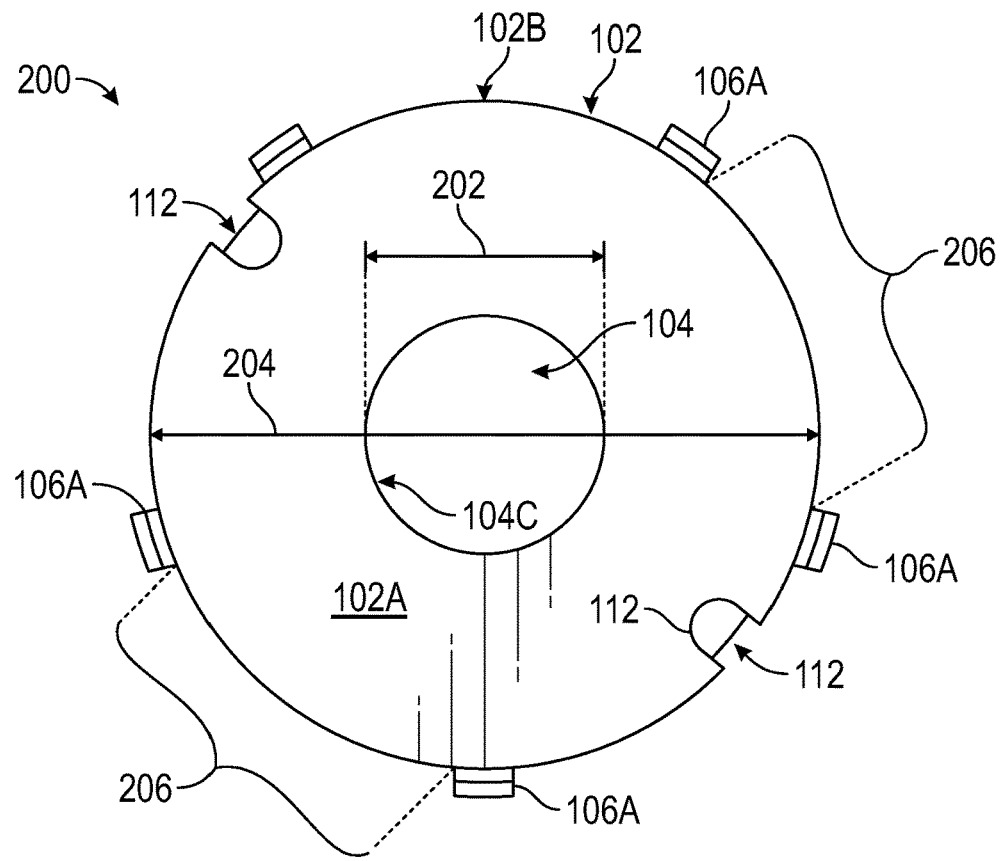
FIG. 2 depicts a top view of an example insert according to aspects of the present disclosure.

FIG. 2 depicts a top view of an insert 200 according to aspects of the present disclosure. The insert 200 includes elements similar to those discussed above in FIGS. 1A and 1B. FIG. 2 shows the first surface 102A of the first portion 102, the first portion 102 having a first portion outside diameter 204. The aperture 104 formed in the first portion 102 has an aperture outside diameter 202 that is defined by an inside wall 102C of the first portion 102. The aperture outside diameter 202 may differ from the first portion outside diameter 204 of the insert 200 by varying amounts. In one example, the aperture outside diameter 202 is from about 10% of the first portion outside diameter 204 to about 75% of the first portion outside diameter 204. As used herein, "about" is to mean that a measurement is within 1%, 3%, or 5% of the stated value. If two or more measurements are "about" the same, the two or more measurements do not differ when viewed by the naked eye and do not negatively impact the functionality of the component (insert or otherwise) at hand. In another example, the aperture outside diameter 202 is from about 25% of the first portion outside diameter 204 to about 60% of the first portion outside diameter 204. In yet another example, the aperture outside diameter 202 is from about 35% of the first portion outside diameter 204 to about 50% of the first portion outside diameter 204.

FIG. 2 further illustrates how each of the plurality of tabs 106A of the locking mechanism 106 is positioned at a distance 206 equidistant from each adjacent tab 106A. FIG. 2 further illustrates the plurality of notches 112. While two notches 112 are shown in FIG. 2, in other examples, the inserts discussed herein may include three or more notches 112. Each notch 112 is formed in the outside surface 102B of the first portion 102, extending into the first surface 102A of the first portion 102. Each of the plurality of notches 112 may be positioned equidistant from an adjacent notch 112. The inserts discussed herein according to aspects of the present disclosure couple to components when positioned in recesses of the components. This coupling can occur via the compression mechanism 110 (or other configurations of compression mechanisms as discussed herein) causing the locking mechanism (106 or 122, or otherwise as discussed) to bite into an overhang portion of the component, as discussed in detail below. In one example, the inserts (100A, 100B, 200, or other inserts as discussed herein) couple to the component without the user of additional elements. In other examples, the plurality of notches 112 are used to deposit a potting material into the recess in which the insert 200 is positioned in order to further secure the insert 200 to the components. In examples where potting material is used, the potting material may include a thermoset or other adhesive material, and may be used, for example, when the aperture 104 of the insert 200 is configured to be coupled to heavy additional components, or in other situations as appropriate. Potting material may be used, for example, if the insert 200 is to be used for applications that may place high strain, angled strain, or long-term strain on the insert 200, and/or depending upon factors such as the dimensions of the insert 200 and recess, a number of inserts 200 to be coupled to the component or to a region of the component, or other factors or combinations of factors.

Figure 3:
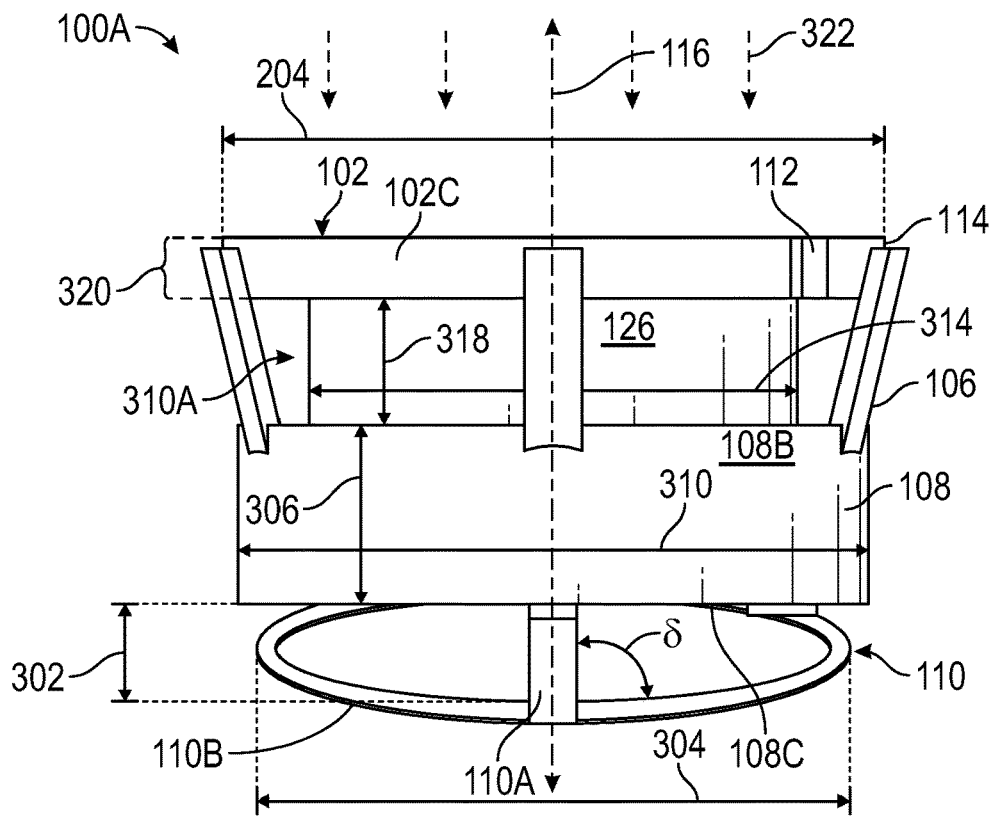
FIG. 3 depicts a side view of an example insert according to aspects of the present disclosure.

FIG. 3 depicts a side view of the first insert 100A of FIG. 1A, according to aspects of the present disclosure. The side view of the first insert 100A includes the first portion 102, the second portion 108, and the connector portion 126 extending between the first portion 102 and the second portion 108. The first portion outside diameter 204 and a second portion outside diameter 310 are shown in FIG. 3. In one example, the first portion outside diameter 204 is about the same as the second portion outside diameter 310. In this example, both the first portion 102 and the second portion 108 are aligned along the central insert axis 116 such that the outside surface 108B of the second portion 108 and the outside surface 102B are aligned along a shared plane. In other examples, the first portion outside diameter 204 is greater than the second portion outside diameter 310. In still other examples, the first portion outside diameter 204 is less than the second portion outside diameter 310.

FIG. 3 further shows that the connector portion 126 has a connector portion outside diameter 314. In one example, the connector portion outside diameter 314 is less than each of the first portion outside diameter 204 and the second portion outside diameter 310. The difference in measurement between the connector portion outside diameter 314 and one or both of the first portion outside diameter 204 and the second portion outside diameter 310 forms a circumferential insert recess 310A. In some examples, the circumferential insert recess 310A which may remain as a negative, unfilled space. In other examples of the assemblies discussed below, the circumferential insert recess 310A may be filled with a potting material (epoxy, thermoset material, metal, alloy, composite, or other material or combination of materials) after the first insert 100A (or other inserts discussed herein) is coupled to a component such as an aircraft component.

In another example, the connector portion outside diameter 314 may be less than each of the first portion outside diameter 204 and the second portion outside diameter 310 by the same amount or by different amounts, depending upon whether the first portion outside diameter 204 and the second portion outside diameter 310 are the same. In one example, the connector portion outside diameter 314 is from about 10% to about 90% of one or both of the first portion outside diameter 204 and the second portion outside diameter 310. In another example, the connector portion outside diameter 314 is from about 20% to about 75% of one or both of the first portion outside diameter 204 and the second portion outside diameter 310. In yet another example, the connector portion outside diameter 314 is from about 35% to about 50% of one or both of the first portion outside diameter 204 and the second portion outside diameter 310. The diameters and relative diameters of features (first portion 102, connector portion 126, second portion 108) of the first insert 100A, or other inserts as discussed herein, may be selected based upon factors such as the material from which the insert (100A or others) is formed, the configuration of the insert (integral locking mechanism (106) or independently formed (non-integral) locking mechanism (122)), the type and configuration/dimensions of the locking mechanism, the cross-sectional geometry of the recess, the intended use of the insert, or other factors or combinations of factors.

FIG. 3 further illustrates the thicknesses of each of the first portion 102, the second portion 108, and the connector portion 126. The thickness (height) 320 of the first portion 102 is shown as being less than a thickness (height) 318 of the second portion 108 and a thickness (height) 306 of the connector portion 126. In other examples, the thickness of each portion of the first insert 100A may have varying measurements and relative measurements, depending upon overall dimensions of the insert, dimensions of the recessed to which the insert is to be coupled, additional elements that are to be coupled to the insert, or other factors or combinations of factors. FIG. 3 shows the orientation of the first compression element 110A relative to the second compression element 110B. Two compression elements (110A, 110B) are shown in the compression mechanism 110, and are shown as being configured at an angle δ, 90 degrees relative to each other. In other examples, the compression mechanisms discussed herein, including the compression mechanism 110, can include three or more elements, and the relative angle (δ) between each element may be less than 90 degrees. The compression mechanism 110 has a compression mechanism outside diameter 304. In one example, the compression mechanism outside diameter 304 is less than one or both of the first portion outside diameter 204 and the second portion outside diameter 310. In another example, the compression mechanism outside diameter 304 is the same than one or both of the first portion outside diameter 204 and the second portion outside diameter 310, such that the compression mechanism 110, the first portion 102, and the second portion 108 are aligned along the central insert axis 116. The compression mechanism 110, as shown in its uncompressed state in FIG. 3, has a height of 302 that is the distance from the second surface 108C of the second portion 108 and a bottom 110D of the compression mechanism 110. The height 302 is reduced in the second, compressed state of the compression mechanism 110 when force is applied along the central insert axis 116 (as shown with arrows 322). For example, when the first insert 100A is under compression (e.g., when the force 322 is applied), the height 302 is reduced. The height 302 is increased when the applied force (322) is removed. In some examples, the height of the compression mechanism 110 when the force 322 is removed (as shown in the assembly examples herein) is the same as the height 302 prior to the force 322 being applied. In other examples, the height of the compression 110 when the force 322 is removed (as shown in the assembly examples herein) may be less than the height 302 prior to the force 322 being applied by 1%-10% of the height 302, depending upon the thickness of the layer of the component the first insert 100A is coupled to, a depth of the recess the first insert 100A is positioned within, or other factors or combinations of factors.

The thicknesses and relative thicknesses of features (first portion 102, connector portion 126, second portion 108) of the first insert 100A, or other inserts as discussed herein, may be selected based upon factors such as the material from which the insert (100A or others) is formed, the configuration of the insert (e.g., as an integral locking mechanism 106 as shown in FIG. 1A, or as non-integral locking mechanism 122), the type and configuration/dimensions of the locking mechanism, the cross-sectional geometry of the recess, a depth of the recess, an angle of the recess relative to a surface of the component in the assembly, the intended use of the insert, or other factors or combinations of factors.

Figure 4A:
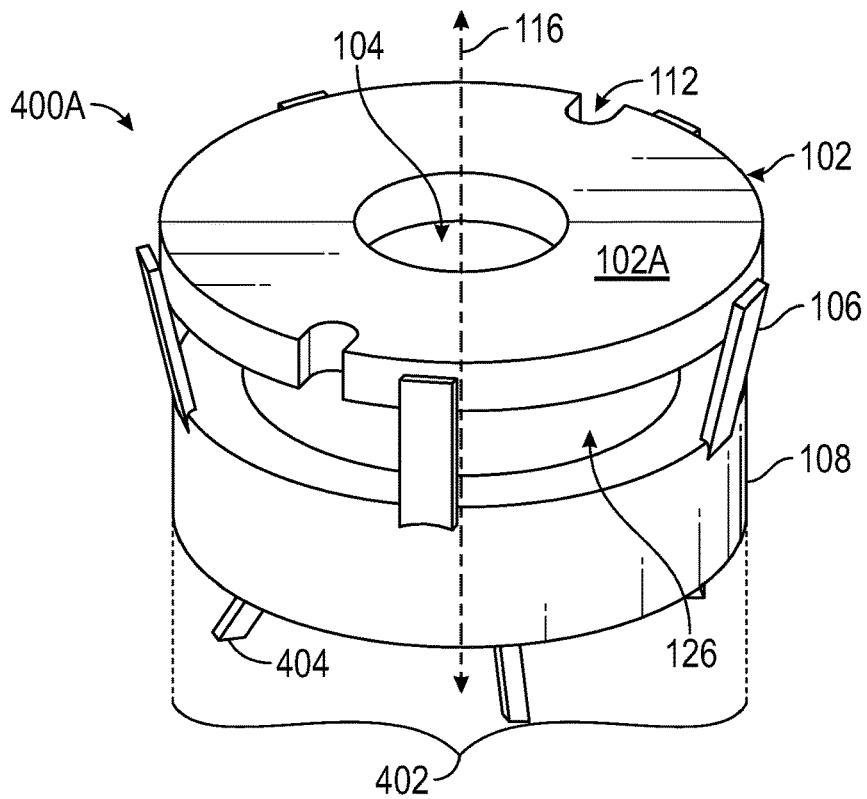
FIG. 4A depicts another example insert according to aspects of the present disclosure.

FIG. 4A depicts another example insert 400A according to aspects of the present disclosure. The example insert 400A, referred to herein as the third insert 400A, may be configured similarly to the first insert 100A and the second insert 100B, having a first portion 102, a second portion 108, and a connector portion 126 extending between the first portion 102 and the second portion 108. In contrast to FIG. 1B, the third insert 400A has a locking mechanism 106, as also illustrated in FIG. 1A. However, in contrast to both FIGS. 1A and 1B, the third insert 400A has a compression mechanism 402 that is configured as a plurality of extensions 404 protruding from the second surface 108C (e.g., the bottom surface) of the second portion 108 at an angle relative to the second surface 108C. In other examples of the third insert 400A, a locking mechanism similar to the locking mechanism 122 in FIG. 1B may be included and thus combined with the compression mechanism 402. The compression mechanism 402 may be formed integrally with the third insert 400A, and thus may be formed from the same material as the other elements of the third insert 400A. In other examples, the compression mechanism 402 may be formed from a different material than the insert body (102, 108, and 126) of the third insert. The compression mechanism 402 functions in the same manner as the other compression mechanisms discussed herein, compressing from a first uncompressed state to a second state when force is applied to the first surface 102A to position the third insert 400A in a recess. The compression mechanism 402 may subsequently expand in a direction opposite the direction of the applied force when the applied force is removed.

Figure 4B:
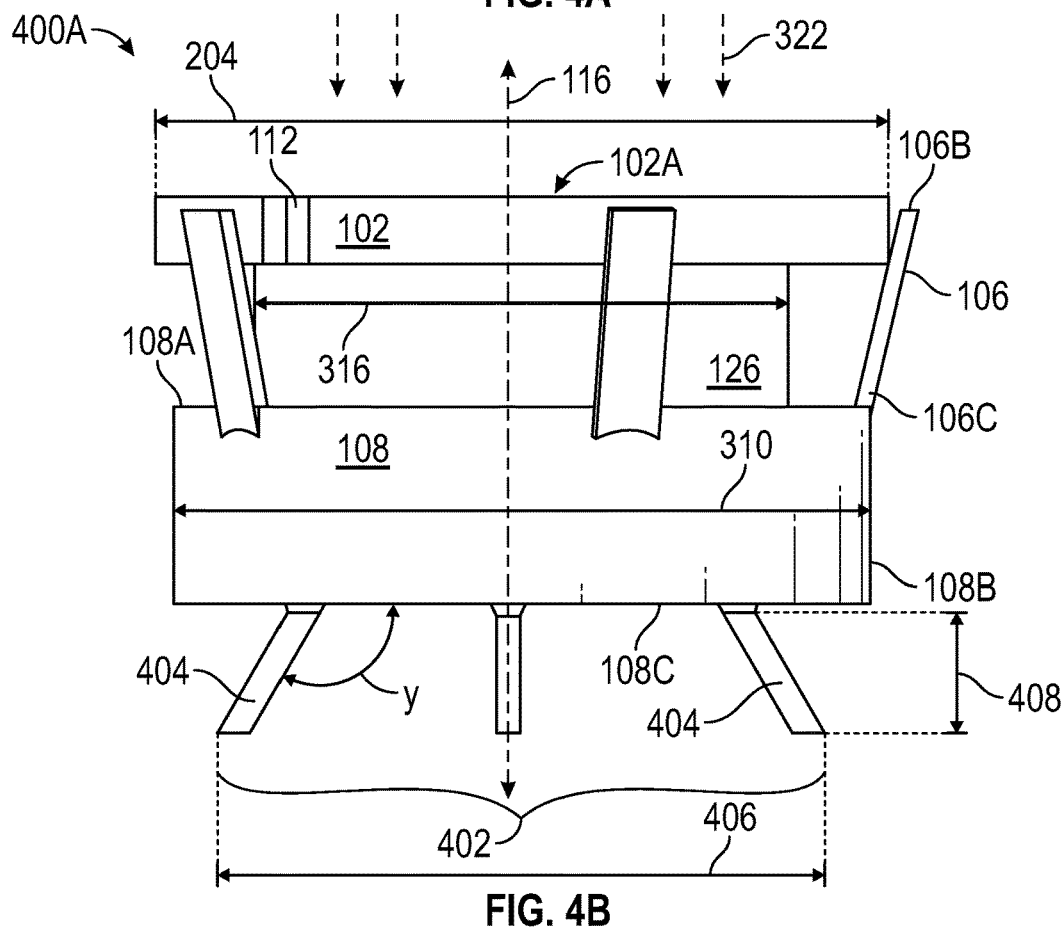
FIG. 4B depicts a side view of an example insert according to aspects of the present disclosure.

FIG. 4B depicts a side view of the third insert 400A according to aspects of the present disclosure, and includes the same elements as shown in FIG. 4A. In addition, FIG. 4B illustrates that each of the plurality of extensions 404 is at an angle γ relative to the second surface 108C of the second portion 108 of the third insert 400A. In one example, the angle γ may be from about 95 degrees to about 145 degrees. In another example, the angle γ may be from about 105 degrees to about 135 degrees. In yet another example, the angle γ may be from about 115 degrees to about 125 degrees.

In one example, the compression mechanism 110, the first portion 102, and the second portion 108 are aligned along the central insert axis 116. The compression mechanism 402 has a compression mechanism outside diameter 406. In one example, the compression mechanism outside diameter 406 is less than one or both of the first portion outside diameter 204 and the second portion outside diameter 310. In another example, the compression mechanism outside diameter 406 is the same than one or both of the first portion outside diameter 204 and the second portion outside diameter 310. The compression mechanism 402, as shown in its uncompressed state in FIGS. 4A and 4B, has a height 408 relative to the second surface 108C of the second portion 108. The height 408 of the compression mechanism 402 is reduced when force is applied along the central insert axis 116 (as shown with arrows 410), e.g., when the third insert 400A is in a second, compressed state. The height of the compression mechanism 402 may be restored to the height 408 when the applied force (410) is removed. While three extensions 404 are shown as comprising the compression mechanism 402 in FIGS. 4A and 4B, in other examples, more or less extensions, for example, two extensions 404 or four or more extensions 404, may be included in the compression mechanism 402.

The height 408 and the compression mechanism outside diameter 406 may be selected based upon factors such as the material from which the compression mechanism 402 (or other compression mechanisms discussed herein) is formed, the geometry of the compression mechanism (402 or other examples), the cross-sectional geometry of the recess, the depth of the recess, an angle of the recess relative to a surface of the component in the assembly, the intended use of the insert, or other factors or combinations of factors. The material from which the compression mechanism 402 is selected may be selected based on similar factors as well. The compression mechanism 402 may be coupled to the second surface 108C of the second portion 108 via an adhesive, injection molding, press-fit, or by other means or combinations of means. The compression mechanism 402 and its extensions 404 are shown as being coupled to the second surface 108C of the second portion 108 in FIG. 4B. In other examples, the compression mechanism 402 may be configured such that the extensions 404 are coupled to the outside surface 108B of the second portion 108.

The inserts discussed herein may include various combinations of geometries, materials, and positions or locking mechanisms and compression mechanisms, such that the inserts are configured to be self-adjusting upon positioning into a recess in response to the removal of force on the insert positioned in the recess. Assemblies including one or more inserts as described above are discussed below.

Example Assemblies Including Insert(s)

Figure 5A:
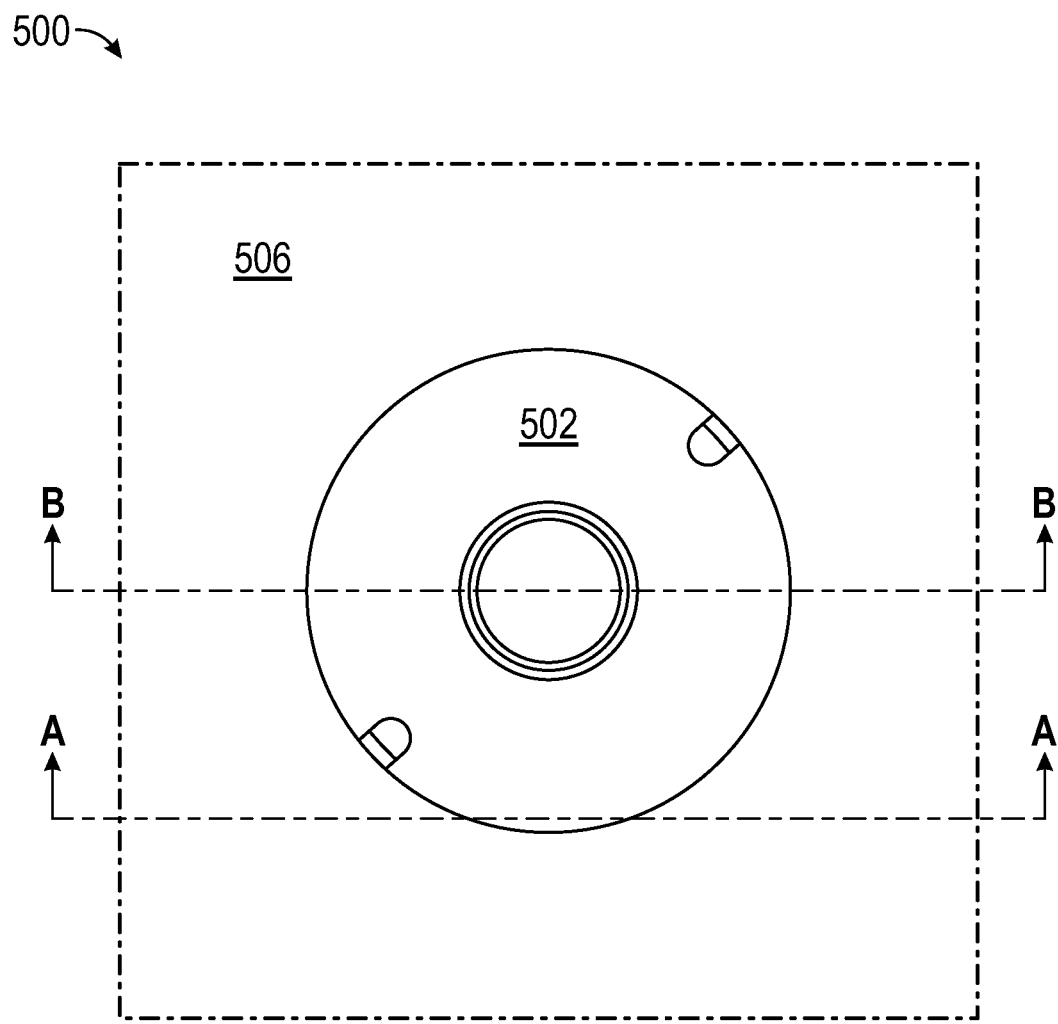
FIG. 5A depicts a top view of an assembly including an insert according to aspects of the present disclosure.

FIG. 5A depicts a top view of an assembly 500 including an insert 502 according to aspects of the present disclosure. The insert 502 is positioned in a recess of a component 506. The component 506 is shown as a partial view in FIG. 5A, and may extend in various directions to have various top view geometries such as a polygon, circle, ellipse, triangle, or combinations thereof. Accordingly, two or more inserts 502 may be included in a component 506. Section A-A is a side view of the assembly 500, shown in FIG. 5B discussed below. Section B-B is a cross-section of the assembly 500 taken through the insert 503, shown in FIG. 5D and discussed below.

FIG. 5B depicts a side view A-A of the assembly 500 including the insert 502, according to aspects of the present disclosure. The insert 502 is positioned in a recess 504 through a recess opening 504A. The recess 504 is formed in the component 506, which may be an aircraft component. The recess 504 is formed along a central assembly axis 550, referred to as such since the central axis of the insert 502 (as discussed in the above figures) is aligned along the same axis as the central axis of the recess 504. The component 506 includes a first layer 510 (that may also be referred to as the top layer) that forms the first surface 528 of the component 506, which may also be referred to as the top surface of the component 506. The first layer 510 is formed over a second layer 508 having a thickness 508A, the recess 504 extending through the first layer 510 through a portion of the second layer 508. As shown in FIG. 5B, the recess 504 may extend through the entirety of the thickness 508A of the second layer 508 to the third layer 514, which may be referred to as the bottom layer. The third layer 514 defines a second surface 560 of the component 506, which may be referred to as the bottom surface of the component 506. In this example, the second surface 560 is opposite the first surface 528, and substantially parallel to the first surface 528. In other examples, one or more of the second surface 560 and first surface 528 may be angled relative to each other at a straight angle, or in a convex or concaved fashion. While the second surface 560 and the first surface 528 are shown as being smooth surfaces in FIG. 5B, in other examples, one or more of the second surface 560 and first surface 528 may include raised or recessed features, or other features.

Turning back to the recess, in other examples, the recess 504 may extend through less than the entirety of the thickness 508A of the second layer 508, for example, for a distance parallel to the central assembly axis 550 equal to from about 10% to about 90% of the thickness 508A of the second layer 508. The recess 504 may thus be defined by a recess opening 504 having a recess opening width 544, sidewall 516, a recess width 558 (defined by a distance between the sidewalls 516), a recess bottom 504B opposite the second surface 560 of the component 506. In this example, the recess bottom 504B is also the third layer 514.

The insert 502 is shown in FIG. 5B as having a first surface 502A, a first portion 534, a second portion 538, and a connector portion 536 extending there between. The insert 502 has a locking mechanism 540, which may be configured similarly to the locking mechanism 106 (FIG. 1A) or the locking mechanism 122 (FIG. 1B), or otherwise configured to couple to the first layer 510. The coupling is discussed in detail in FIG. 5C below. The insert 502 further includes at least one notch 568 and a compression mechanism 530 that may be configured as the compression mechanism 110 shown in FIG. 1A or as the compression mechanism 402 in FIG. 4A, or otherwise configured to operate as discussed herein. The compression mechanism 530 is shown in FIG. 5B as being seated to abut the recess bottom 504B but does not contact the sidewall 516 of the recess. In other examples, one or more portions of the compression mechanism 530 may be in contact with one or more portions of the sidewall 516.

As discussed above, the operation of the insert 502 includes, subsequent positioning the insert 502 in the recess 504, applying force 532 as shown by the arrows of 502 parallel to the central assembly axis 550. The application of force 532 causes the compression of the compression mechanism 530 in the direction of force 532. The first portion outside diameter 554 is greater than the recess opening diameter 556, and an overhanging portion (shown in detail in FIG. 5C) of the top layer 510 that extends into the recess 504. The first layer 510 is fabricated from material that is flexible to allow for the positioning of the insert 502 in the recess 504 without tearing or permanently deforming the first layer 510. The application of force 532 pushes the insert 502 past the overhanging portion of the first layer 510 when the compression mechanism 530 is in a compressed state. When the force 532 is removed, the compression mechanism 530 releases into (decompresses to) the uncompressed state, as shown in FIG. 5B. This decompression forces the locking mechanism 540 upwards and secures it to the overhanging portion of the first layer 510. The decompression causes the insert 502 to self-adjust, such that the first surface 502A of the insert 502 is flush with, that is, is co-planar with, the first surface 528 of the component 506. The shared plane 552 of the first surface 528 and the first surface 502A is illustrated in FIG. 5B.

Figure 5C:
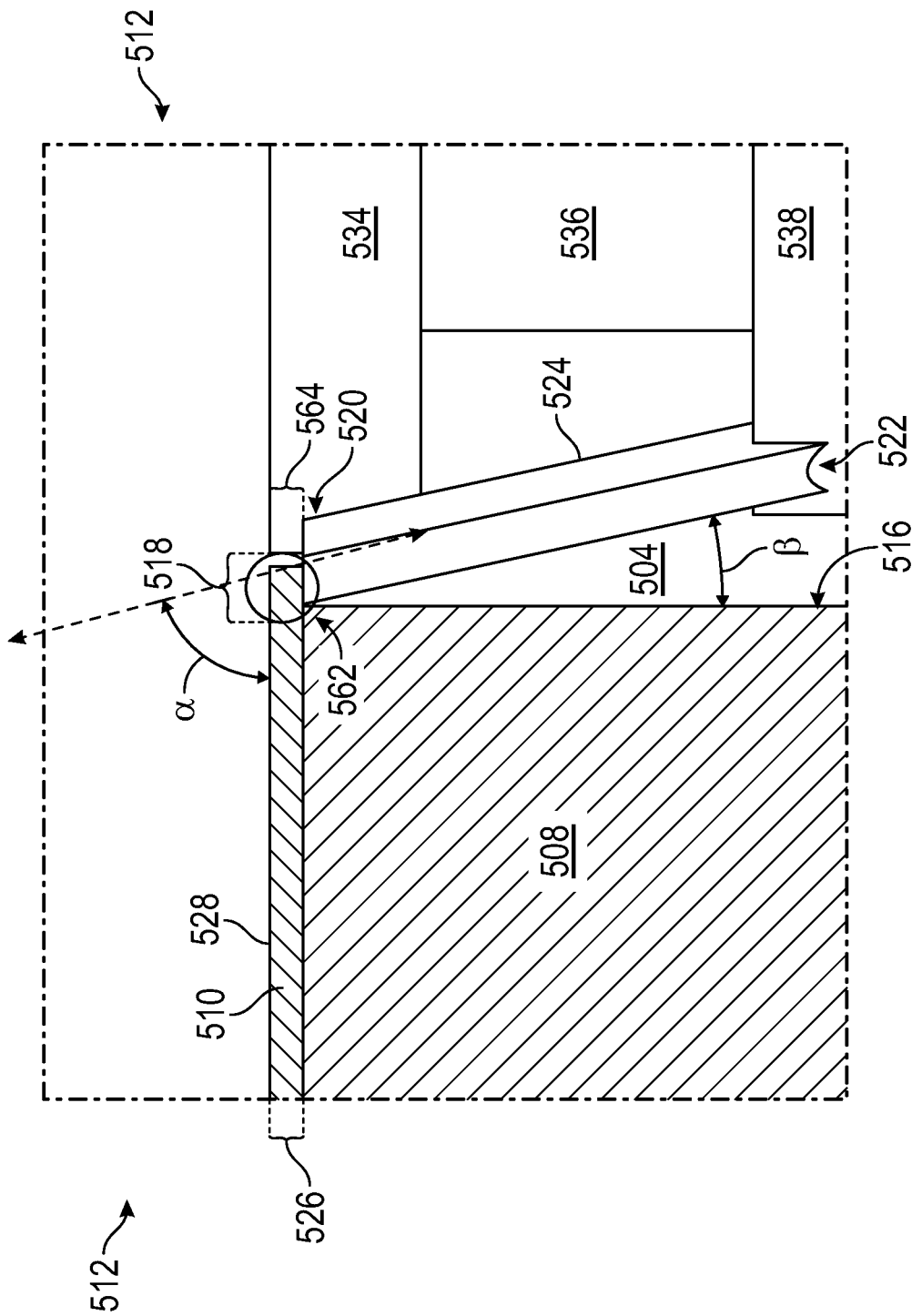
FIG. 5C depicts an example of a portion of the assembly of FIG. 5B according to aspects of the present disclosure.

FIG. 5C depicts an example of a portion 512 of the assembly 500, according to aspects of the present disclosure. FIG. 5C shows the coupling region 562 of a tab 524 the locking mechanism 540 (from FIG. 5B) and the first layer 510. As discussed in other examples of inserts above, the tab 524 extends from the first portion 534 to the second portion 538. A first end 520 of each tab 524 is positioned (e.g., when the locking mechanism 540 is formed integrally with the insert 502) or formed (when the locking mechanism 540 is not formed integrally with the insert 502) at the first portion 534. A second end 522 of each tab 524 being positioned or formed (depending upon the example) at the second portion 538. Each tab 524 of the plurality of tabs 524 of the locking mechanism 540 may be configured such that the first end 520 of the tab 524 is at an angle α relative to the first surface 528 of the component 506. In one example, the angle α may be from about 35 degrees to about 85 degrees. In another example, the angle α may be from about 45 degrees to about 75 degrees. In one example, the angle α may be from about 55 degrees to about 85 degrees. Depending upon the angle of the sidewall 516 of the recess 504, the second end 522 of the tab 524 (as well as other tabs 524 of the locking mechanism 540) may be at an angle β relative to the sidewall 516. In one example, the angle β may be from about 10 degrees to about 45 degrees. In another example, the angle β may be from about 15 degrees to about 35 degrees. In yet another example, the angle β may be from about 10 degrees to about 25 degrees.

The offset distance 564 between the first end 520 of the tab 524 (which may also be described as the offset distance between the top of the locking mechanism 540) and the top surface 502A of the insert 502 may be determined by a thickness 526 of the first layer 510. In other examples, the offset distance 564 may be determined by factors including a material of the tab(s) 524, the material(s) from which the first layer 510 is formed, the purpose of the insert 502, a position of the insert 502 relative to other inserts in the component 506, a number of inserts coupled to the component 506, or other factors or combinations of factors. In one example, the thickness 526 may range from about 0.020" to about 0.100". In other examples, the thickness 526 may range from about 0.024" to about 0.48". In still other examples, the thickness 526 may range from about 0.030" to about 0.75". As discussed above, an overhang portion 518 is shown in FIG. 5C to extend into the recess 504. The overhang portion 518 may extend for a distance from about 1% to about 10% of the width 558 of FIG. 5B, which may also be referred to as the inner diameter of the recess 504, circumferentially into the recess 504. In another example, the overhang portion 518 may extend for a distance from about 2% to about 6% of the width 558 of FIG. 5B. In another example, the overhang portion 518 may extend for a distance from about 1% to about 1% of the width 558 of FIG. 5B.

Figure 5D:
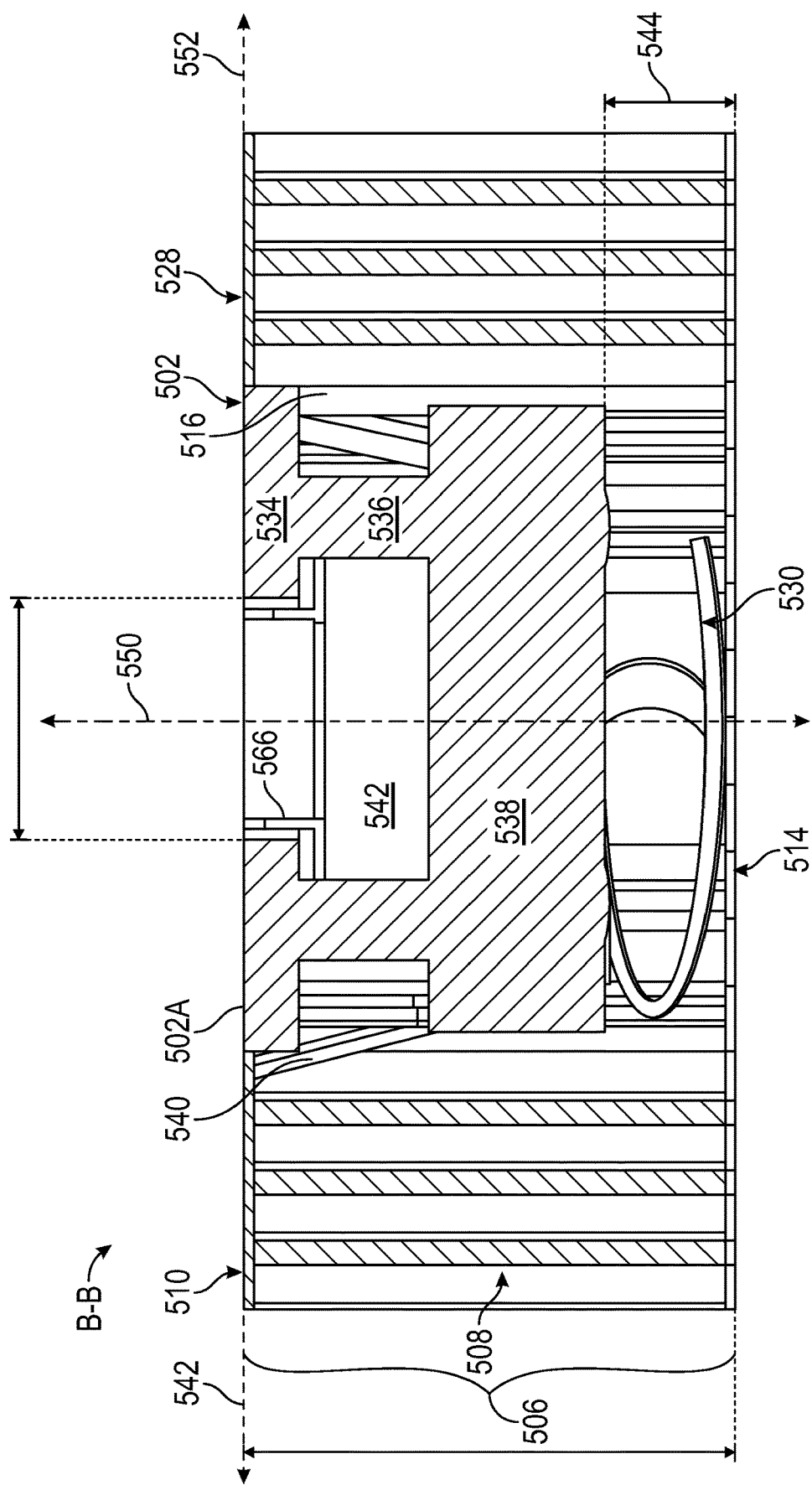
FIG. 5D depicts a cross-sectional view of an assembly including an insert according to aspects of the present disclosure.

FIG. 5D depicts a cross-sectional view B-B of the assembly 500 including an insert 502, according to aspects of the present disclosure. FIG. 5D shows the same elements of the insert 502 and the component 506 as shown in FIGS. 5A, 5B, and 5C. The compression mechanism 530 is shown in FIG. 5D in a first, uncompressed, state, and the first surface 502A is co-planar with the top surface 528 of the component 506 along the plane 552. In addition, FIG. 5D shows an aperture 542 in the first surface 502A of the insert 502. In some examples, an attachment element 566 may be disposed in the aperture 542. This attachment element 566 may include a plurality of threads, a helically coiled element, or other mechanism including a plurality of positive or negative features that enable a second component (not shown) to be coupled to the component 506 via the insert 502.

Figure 6A:
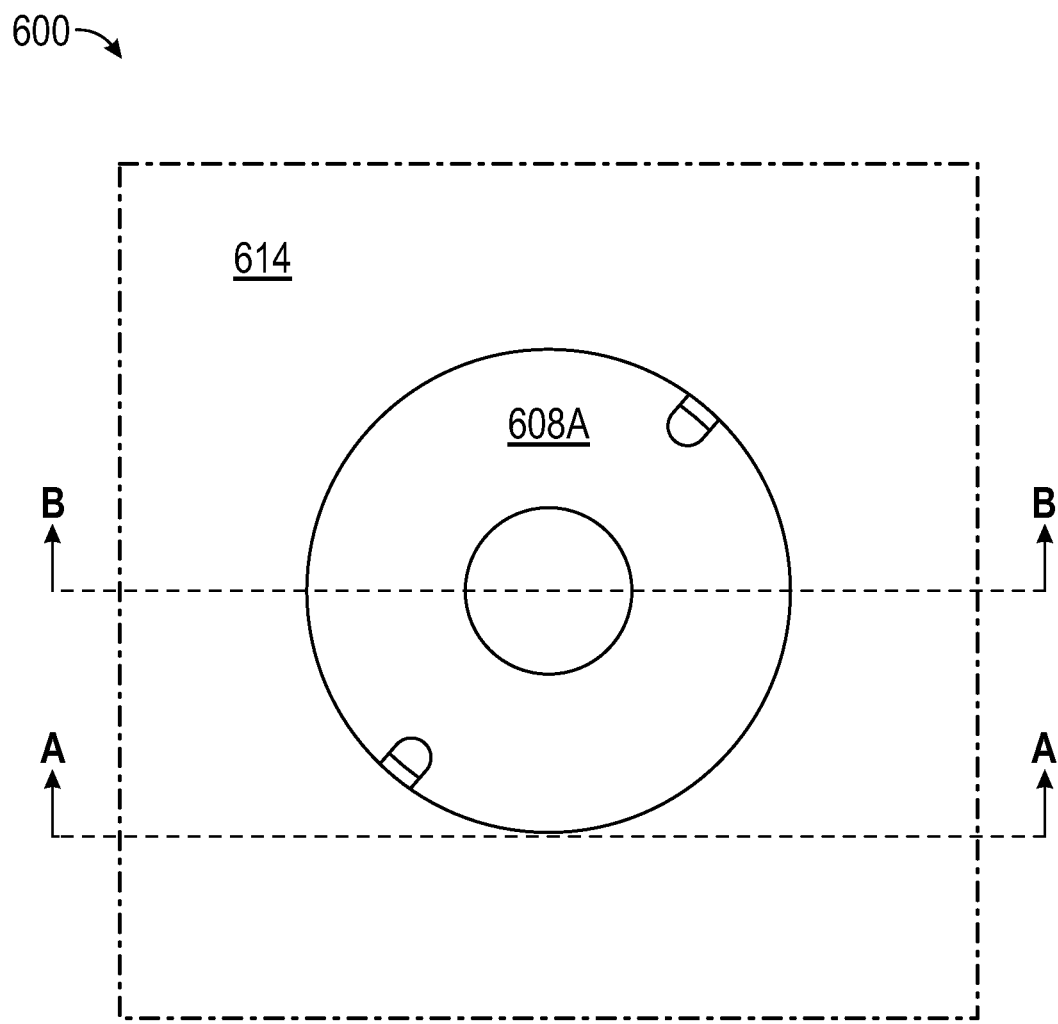
FIG. 6A depicts a top view of another assembly according to aspects of the present disclosure.

FIG. 6A depicts a top view of another assembly 600 including an insert 608A according to aspects of the present disclosure. The insert 502 is positioned in a recess of a component 506. The component 614 is shown as a partial view in FIG. 6A, and may extend in various directions to have various top view geometries such as a polygon, circle, ellipse, triangle, or combinations thereof. Accordingly, two or more inserts 608A may be included in a component 614. Section A-A is a side view of the assembly 600, shown in FIG. 6B discussed below. Section B-B is a cross-sectional view of the assembly 600 through the insert 608A (and 608B, not shown here), and is shown in FIG. 6C below.

Figure 6B:
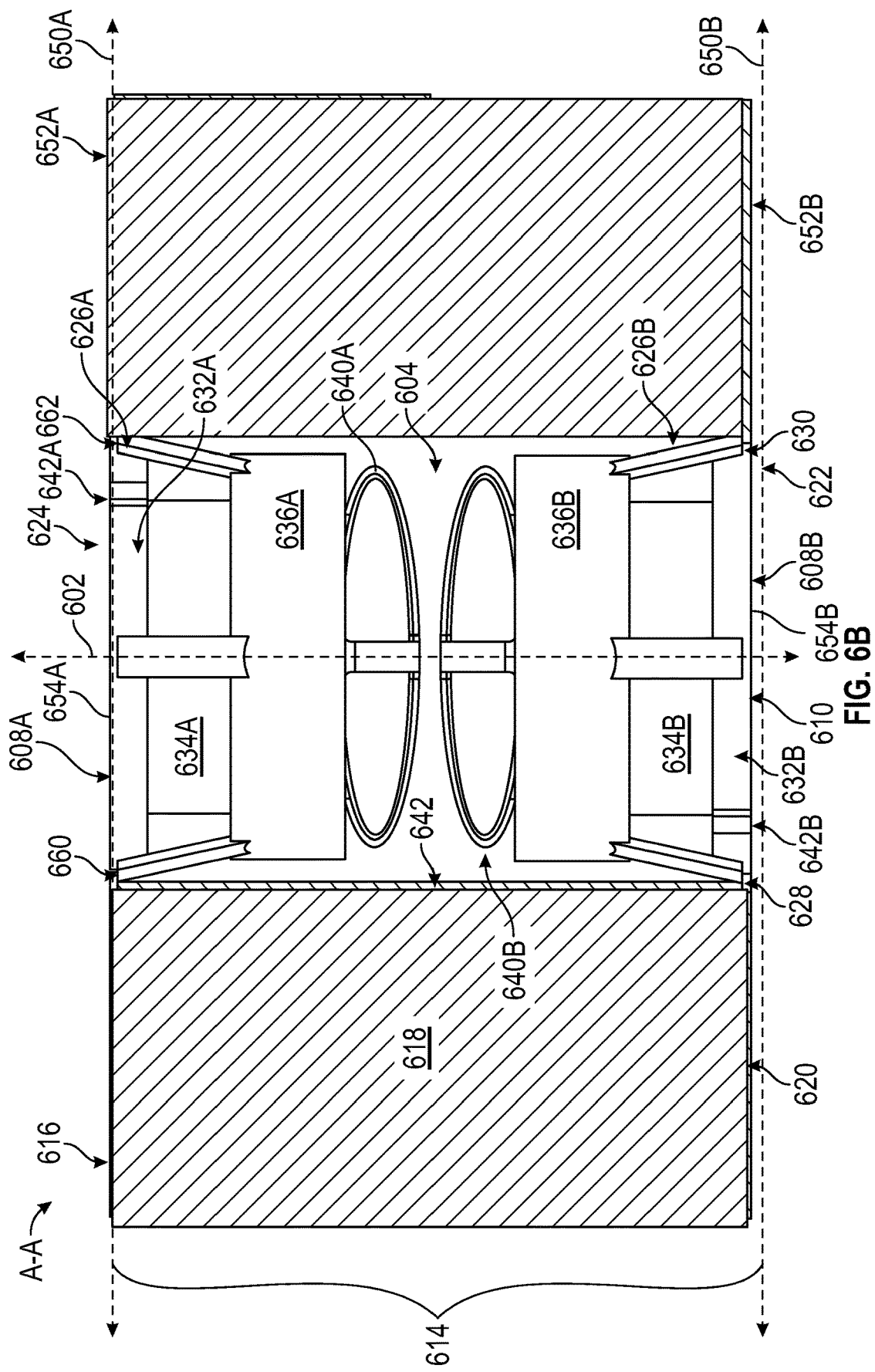
FIG. 6B depicts a side view of an assembly according to aspects of the present disclosure.
Figure 6C:
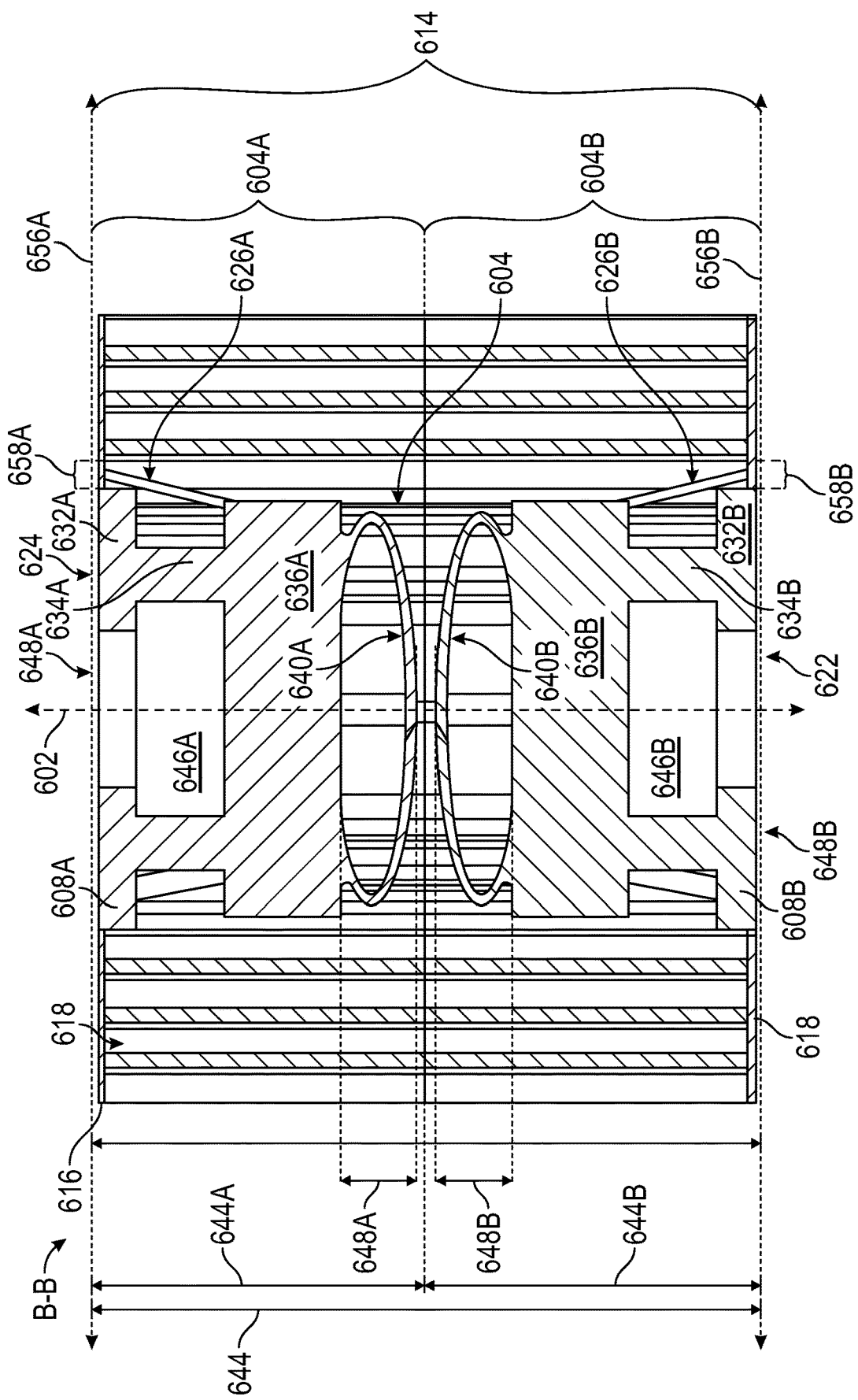
FIG. 6C depicts a cross-sectional view of an assembly according to aspects of the present disclosure.

FIG. 6B depicts a side view A-A of the assembly 600 from FIG. 6A, according to aspects of the present disclosure. The assembly 600 is similar to the assembly 500, in that a component 614 having a first layer 616 formed on a second layer 618 and a third layer 620 formed on the second layer 618 opposite the first layer 616. The assembly 600 has at least one recess 604 formed therein. However, in contrast to the assembly 500, the recess 604 of the assembly 600 is a through-hole. The recess 604 extends from a first opening 624 in the first layer 616, which forms the first surface 652A and may be referred to as the top surface of the component 614, through the second layer 618 to a second opening 622 in the third layer 620. The third layer 620 may be referred to as the bottom layer of the component 614. The recess 604 is further defined by a sidewall 642. The sidewall 642 is shown herein as being parallel to a central assembly axis 602 of the assembly 600. The first opening 624 has a diameter that is about the same as a diameter of the second opening 622. In other examples, the sidewall 642 may be tapered such that the diameter of the first opening 624 is greater than the diameter of the second opening 620. In still other examples, the sidewall 642 may be tapered such that the diameter of the first opening 624 is less than the diameter of the second opening 622. The recess 604 has two inserts positioned and secured therein. Accordingly, the central assembly axis 602 is a shared central axis of the first insert 608A, a second insert 608B, and the recess 604.

The first insert 608A may be similar to the other inserts discussed herein, and includes a first portion 632A, a second portion 636A, and a connector portion 634A extending there between. The first insert 608A further includes at least one notch 642A formed in the first portion 632A. A first locking mechanism 626A of the first insert 608A may be in the form of a plurality of individual elements as discussed in the locking mechanism 106 in FIG. 1A, or in the form of a plurality of connected elements as discussed in the locking mechanism 122 in FIG. 1B, or other configurations as discussed herein, such that it is configured to couple to an overhang portion (shown in FIG. 6B as 658A). The first insert 608A also includes a first compression mechanism 640A which is capable of being in a first, uncompressed state, changing to a second, compressed state in response to the application of force, and changing back into the first, uncompressed state in response to the removal of the applied force. The first compression mechanism 640A may be configured in any of the manners as discussed herein, including the compression mechanisms discussed in in FIGS. 1A and 4A and 4B. The first insert 608A is positioned in the recess 604 such that the first surface 654A of the first insert 608A and the first surface 652A of the component 614 are co-planar along the first plane 650A with when the first locking mechanism 626A is secured to the recess 604 via the overhang portion of the first layer 616. A plurality of coupling regions (660, 662) indicate where the first locking mechanism 626A couples to the first layer 616, similar to what is shown in FIG. 5C. It is understood that a coupling region is formed at any location along the overhang portion of the first layer 616 to which the first locking mechanism 626A is coupled, and that the two coupling regions 660 and 662 are shown for illustrative purposes, as more coupling regions may be present along an opening such as the first opening 624.

The second insert 608B may be similar to the other inserts discussed herein, and includes a first portion 632B, a second portion 636B, and a connector portion 634B extending there between. The second insert 608B has a top surface 654B, which, while referred to as a "top" surface herein, may be considered to be positioned along a bottom surface 652B of the component 614. The second insert 608B further includes at least one notch 642B formed in the first portion 632B. A second locking mechanism 626B of the second insert 608B may be in the form of a plurality of individual elements as discussed in the locking mechanism 106 in FIG. 1A, or in the form of a plurality of connected elements as discussed in the locking mechanism 122 in FIG. 1B, or other configurations as discussed herein, such that it is configured to couple to an overhang portion (shown in FIG. 6B as 658B). The second insert 608B also includes a second compression mechanism 640B which is capable of being in a first, uncompressed state, changing to a second, compressed state in response to the application of force, and changing back into the first, uncompressed state in response to the removal of the applied force. The second compression mechanism 640B may be configured in any of the manners as discussed herein, including the compression mechanisms discussed in in FIGS. 1A and 4A and 4B. The second insert 608B is positioned in the recess 604 such that the first surface 654B of the second insert 608B and the first surface 652A of the component 614 are co-planar along the second plane 650B when the second locking mechanism 626B is secured to the recess 604 via the overhang portion of the third layer 620. A plurality of coupling regions (628, 630) indicate where the second locking mechanism 626B couples to the second layer 618. It is understood that a coupling region is formed at any location along the overhang portion of the second layer 618 where a portion of the second locking mechanism 626B is coupled, and that the two coupling regions 628, 630 are shown for illustrative purposes.

FIG. 6C depicts a cross-sectional view of section B-B of the assembly 600, according to aspects of the present disclosure. FIG. 6C shows the same elements of the assembly 600 and as shown in FIGS. 6A and 6B. The compression mechanisms 640A and 640B are also shown in FIG. 6C in uncompressed states. Further, the first surface 654A of the first insert 608A and the first surface 652A of the component 614 are co-planar along the first plane 656A, and the first surface 654B of the second insert 608B and the first surface 652A of the component 614 are co-planar along the second plane 656B. In this example, the first insert 608A is positioned in a first portion 604A of the recess 604, and the second insert 608B is positioned in a second portion 604B of the recess 604. The first insert 608A has a top surface 654A. An overall thickness 644 of the component 614 is shown in FIG. 6C. A first thickness 644A of the first portion 604A of the recess 604 is shown to be substantially similar to the second thickness 644B of the second portion 604B in FIG. 6C. In other examples, the first thickness 644A of the first portion 604A of the recess 604 may be greater than the second thickness 644B of the second portion 604B by an amount from about 10% to about 75%. In yet other examples, the first thickness 644A of the first portion 604A of the recess 604 may be less than the second thickness 644B of the second portion 604B by an amount from about 10% to about 75%. In addition, FIG. 6C shows a first aperture 646A in the first surface 648A of the first insert 608A and a second aperture 646B in the first surface 648B of the second insert 608B. In contrast to FIG. 5D, there are no attachment elements disposed in either of the first aperture 646A or the second aperture 646B in the assembly 600. In this example, additional components may still be coupled to the first insert 608A and/or the second insert 608B via each respective aperture using magnets, a press-fit, or other means or combinations of means. However, in some examples, an attachment element may be disposed in one or both of the first aperture 646A or the second aperture 646B.

Example Method of Using an Insert

Figure 7:
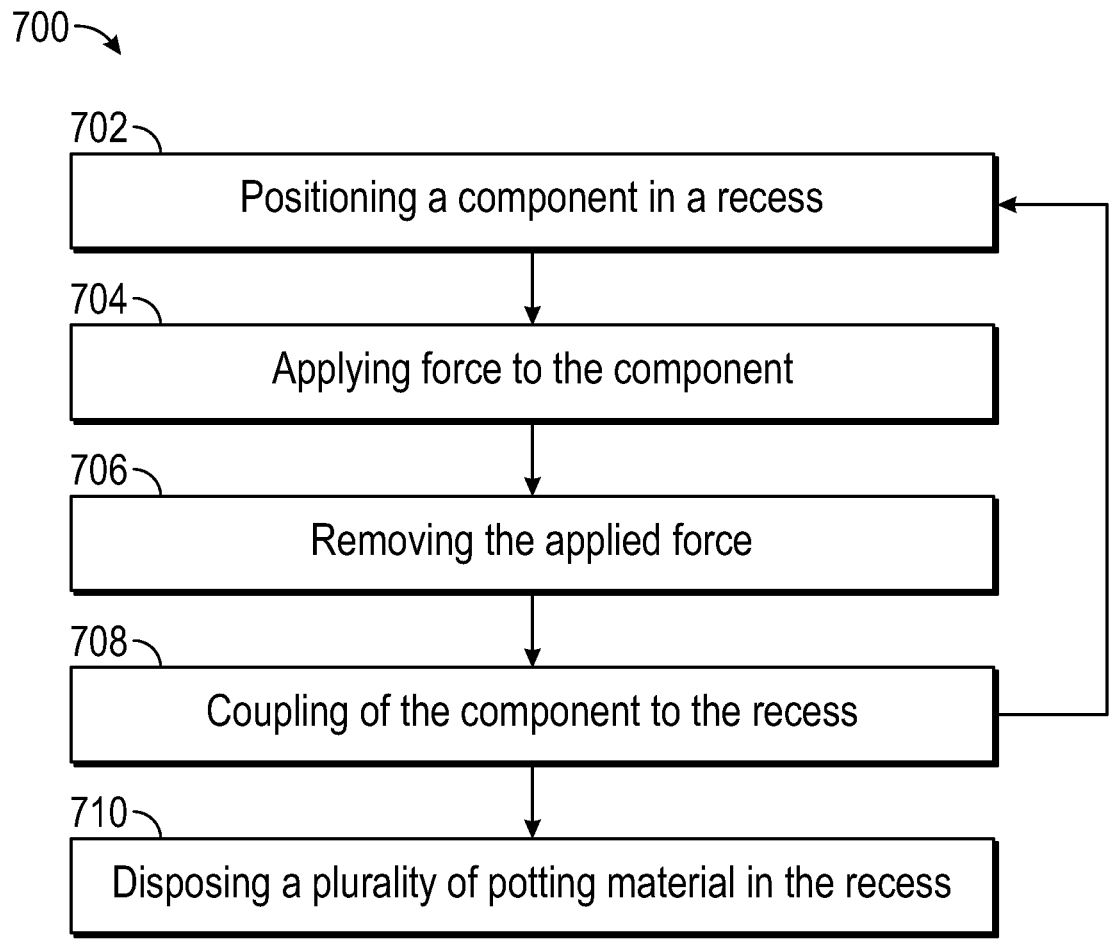
FIG. 7 depicts a flow chart of a method of assembly according to aspects of the present disclosure.

FIG. 7 depicts a flow chart of a method 700 of using an insert according to aspects of the present disclosure. At operation 702 in the method 700, a component such as one of the inserts discussed above is positioned in a recess of, for example, an aircraft component (702—Positioning a component in a recess). At operation 702, the compression mechanism of the insert may be in a first, uncompressed state. The recess may be formed such that the recess extends through a first layer, which may include two or more interlayers, and through at least a portion of a second layer positioned adjacent to the first layer. In some examples, the aircraft component may include a third layer on a side of the second layer opposite the first layer. The third layer may include two or more interlayers. The insert may be positioned in the recess such that the insert and the recess are aligned along a shared central axis. The recess may be formed at a right angle relative to a first surface of the top layer, the first surface being an outermost top surface of the aircraft component. In other examples, the recess may be formed at an angle relative to the first surface that is an angle other than a right angle. In some examples, the recess may be a blind hold including a bottom surface such that the recess extends through the first layer and into at least a portion of the second layer. In other examples, the recess may be a through-hole that extends through the first layer through both the second layer and the third layer such that there is a first opening in the first layer and a second opening in the third layer. The recess may be formed as having a straight sidewall, or as having an angled sidewall such that the recess is tapered towards or away from the top surface. In some examples, multiple inserts may be positioned in one or more recesses at operation 702. At least one of the top layer and/or the bottom layer of the aircraft component extends into an opening of the recess for a predetermined distance to form an overhang portion. The overhang portion of each of the first (top) layer and second (bottom) layers enables the locking mechanism to couple to the recess, as discussed below.

At operation 704, subsequent to the insert(s) being positioned in the recess at operation 702, force is applied to the insert (704—Applying force to the component). In one example, force is applied to the top surface (e.g., the first surface of the first portion) of the insert, along the shared axis. The force applied at operation 704 is sufficient to cause the compression mechanism to change to a second, compressed state, as discussed above. When in the compressed state, the locking mechanism is forced underneath the top layer (and/or the bottom layer) of the aircraft panel (or other component having a recess and an overhang portion as discussed above) such that the overhang portion of the top layer or the bottom layer covers the locking mechanism.

At operation 706, the force applied at operation 704 is removed, causing the compression mechanism to expand in a direction opposite of the applied force and return to the first, uncompressed state. The return to the first, uncompressed state moves the locking mechanism the opposite direction of the applied force as well (706—Removing the applied force) towards the overhang portion of the recess. At operation 708, in response to the removal of force at operation 706, the locking mechanism is forced towards the overhang portion of the top layer (or the bottom layer) and "bites" (couples) to the recess. (708—Coupling of the component to the recess). Stated differently, the locking mechanism couples to the recess via the portion of the top layer (or bottom layer) that extends into the opening of the recess (the overhang portion), securing the insert to the component.

In some examples, the method 700 may repeat operations 702-708, such that a second insert is positioned in the other opening of a through-hole recess and the recess thus contains two inserts, one coupled to the top layer and one coupled to the bottom layer. In still other examples, the method 700 may repeat operations 702-708 to couple additional inserts to other recesses of the component that may be formed in the same surfaces or in different surfaces of the component.

In some examples, subsequent to operation 708, at operation 710, one or more notches in the insert are used as access points to dispose a plurality of potting material into at least a portion of the recess (710—Disposing potting material into the recess). This may occur, for example, if the insert(s) are to be used to secure heavy elements, or depending upon the material or materials of the insert, the top layer or bottom layer, or other factors as appropriate for the application intended for the inserts.

Accordingly, using the inserts and methods of assembly discussed herein, one or more inserts may be securely coupled to one or more components such that the inserts and component are co-planar, and thus ready to have additional elements assembled to the component via the inserts. The self-adjusting inserts become level (co-planar) with the component surfaces, reducing the need for further finishing and adjustment operations and increasing the speed and quality of assembly operations.

In the current disclosure, reference is made to various aspects. However, it should be understood that the present disclosure is not limited to specific described aspects. Instead, any combination of the above features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method of forming an assembly, comprising:
    positioning a first component in a recess of a second component;
        the first component having:
            a central axis;
            a first portion having a first surface;
            a second portion having a second surface;
            a first aperture formed in the first portion along the central axis;
            a first locking mechanism extending circumferentially around the first component, the first locking mechanism being offset from the first surface by a first offset distance; and
            a first compression mechanism coupled to the second surface, the first compression mechanism being in a first, uncompressed state,
        the second component having a first layer formed on a second layer, a portion of the first layer extending for a first predetermined distance into a first opening of the recess,
    applying force along the central axis of the first component in a first direction, causing the first compression mechanism to be in a second, compressed state, wherein the central axis of the first component is aligned with a central recess axis of the recess;
removing the force applied along the central axis in the first direction; and
coupling, in response to removing the force applied in the first direction, the first component to the recess, wherein removing the force applied in the first direction causes the first compression mechanism to return to the first, uncompressed, state, such that the first locking mechanism is secured to the portion of the first layer extending around the first opening of the recess, the first surface being co-planar with the first layer of the second component when the first compression mechanism returns to the first, uncompressed, state.

2. The method of claim 1, further comprising:
positioning a third component in the recess of the second component, the recess being a through-hole extending from the first opening on the first surface of the second component to a second opening on the second surface of the second component along the central axis, the second surface being opposite the second surface;
the third component having:
a third portion having a third surface;
a fourth portion having a fourth surface;
a second aperture formed in the third portion along the central axis;
a second locking mechanism extending circumferentially around the first component, the second locking mechanism being offset from the third surface by a second offset distance; and
a second compression mechanism coupled to the fourth surface, the second compression mechanism being in a first, uncompressed, state,
the second component having a third layer formed on the second layer, a portion of the third layer extending a second predetermined distance into the second opening,
applying force along the central axis of the third component in a second direction, causing the second compression mechanism to be in a second, compressed state;
removing the force applied along the central axis in the second direction; and
coupling, in response to the removing the force applied along the central axis, the third component to the recess, wherein removing the force applied along the central axis causes the second compression mechanism return to the first, uncompressed state, such that the second locking mechanism is secured to the portion of the third layer extending around the second opening of the recess, the third surface of the third component being co-planar with the third layer of the second component when the second compression mechanism returns to the first, uncompressed state.

3. The method of claim 1, further comprising: disposing, via a first notch formed in the first surface of the first component, a plurality of potting material into the recess of the second component.

4. The method of claim 1, the first component further comprising a connector portion extending between the first portion and the second portion.

5. The method of claim 1, the first locking mechanism comprising a plurality of tabs, each tab of the plurality of tabs extending between the first portion and the second portion.

6. The method of claim 4, wherein the first portion, the second portion, the connector portion, and the locking mechanism are each formed from a same material, the same material selected from the group consisting of a polymer, a metal, a composite, a ceramic, and combinations thereof.

7. The method of claim 1, wherein the first compression mechanism comprises a material selected from the group consisting of a polymer, a metal, a composite, a ceramic, and combinations thereof.

8. The method of claim 1, wherein the first aperture includes an attachment element.

9. The method of claim 1, wherein a first outside diameter of the first portion is substantially similar to a second outside diameter of the second portion.

10. The method of claim 9, wherein an outside diameter of the connector portion is less than both the first outside diameter and the second outside diameter.

11. The method of claim 5, wherein each tab of the plurality of tabs of the locking mechanism is disposed at an angle (a) relative to the first surface of the first portion from about 10 degrees to about 80 degrees.

12. The method of claim 1, wherein the first offset distance is about 0.020 inches to about 0.050 inches.

13. The method of claim 1, wherein the recess extends into the second layer and is defined by an opening in the first surface and a sidewall.

14. The method of claim 3, wherein the plurality of potting material comprises a thermoset.

15. The method of claim 3, wherein the plurality of potting material is independently selected from the group consisting of an epoxy, a thermoset material, a metal, an alloy, a composite, and combinations thereof.

16. The method of claim 1, wherein the second component is an aircraft component.

17. The method of claim 16, wherein the aircraft component is a panel on an aircraft body.

18. The method of claim 16, wherein the aircraft component is an interior of a cabin.

19. The method of claim 16, wherein the aircraft component is a wing.

20. The method of claim 16, wherein the aircraft component is an engine.

* * * * *